United States Patent
Yuksel Imer et al.

(10) Patent No.: US 12,478,908 B2
(45) Date of Patent: Nov. 25, 2025

(54) USE OF PHOTOTHERMAL AGENTS IN AIR FILTERS

(71) Applicants: SABANCI UNIVERSITESI NANOTEKNOLOJI ARASTIRMA VE UYGULAMA MERKEZI SUNUM, Istanbul (TR); ISTANBUL TEKNIK UNIVERSITESI, Istanbul (TR)

(72) Inventors: Derya Yuksel Imer, Istanbul (TR); Hayriye Unal, Istanbul (TR)

(73) Assignees: SABANCI UNIVERSITESI NANOTEKNOLOJI ARASTIRMA VE UYGULAMA MERKEZI SUNUM, Istanbul (TR); ISTANBUL TEKNIK UNIVERSITESI, Istanbul (TR)

( * ) Notice: Subject to any disclaimer, the term of this patent is extended or adjusted under 35 U.S.C. 154(b) by 484 days.

(21) Appl. No.: 18/008,194

(22) PCT Filed: Jun. 4, 2020

(86) PCT No.: PCT/TR2020/050487
§ 371 (c)(1),
(2) Date: Dec. 5, 2022

(87) PCT Pub. No.: WO2021/246977
PCT Pub. Date: Dec. 9, 2021

(65) Prior Publication Data
US 2023/0173423 A1 Jun. 8, 2023

(51) Int. Cl.
| | |
|---|---|
| *B01D 46/00* | (2022.01) |
| *A01N 25/10* | (2006.01) |
| *A61L 9/18* | (2006.01) |
| *B01D 39/16* | (2006.01) |
| *B01D 39/20* | (2006.01) |

(52) U.S. Cl.
CPC ......... *B01D 46/0028* (2013.01); *A01N 25/10* (2013.01); *A61L 9/18* (2013.01); *B01D 39/16* (2013.01); *B01D 39/20* (2013.01); *A61L 2209/12* (2013.01); *A61L 2209/14* (2013.01); *B01D 2239/0442* (2013.01); *B01D 2239/0471* (2013.01); *B01D 2279/65* (2013.01)

(58) Field of Classification Search
CPC ............................ B01D 46/0028; A01N 25/10
See application file for complete search history.

(56) References Cited

U.S. PATENT DOCUMENTS

2009/0165223 A1 * 7/2009 Braunecker ......... D06M 13/005
8/444

FOREIGN PATENT DOCUMENTS

| CN | 110527279 A | 12/2019 | |
|---|---|---|---|
| CN | 110725024 A * | 1/2020 | ............... C02F 1/14 |
| CN | 110984298 A | 4/2020 | |

OTHER PUBLICATIONS

Machine translation of CN 110725024 (Year: 2020).*
Jeongan Choi, et al., Herbal extract incorporated nanofiber fabricated by an electrospinning technique and its application to antimicrobial air filtration, ACS Applied Materials & Interfaces, 2015, pp. 1-28.
Zhaoxiang Zhong, et al., Unusual air filters with ultrahigh efficiency and antibacterial functionality enabled by ZnO hanorods, ACS Applied Materials & Interfaces, 2015, pp. 1-25.
Ekarat Detsri, et al., Layer-by-layer deposition of green synthesised silver nanoparticles on polyester air filters and ts antimicrobial activity, Journal of Experimental Nanoscience, 2016, pp. 1-10.
Yuzhe Sun, et al., Facile fabrication of polydopamine nanotubes for combined chemo-photothermal therapy, Journal of Materials Chemistry B, 2019, pp. 6828-6839, vol. 7.
Hong Xu, et al., The preparation and antibacterial effects of dopa-cotton/AgNPs, Applied Surface Science, 2011, pp. 6799-6803, vol. 257.
Thomas G. Barclay, et al., Versatile Surface Modification Using Polydopamine and Related Polycatecholamines: Chemistry, Structure, and Applications, Advanced Materials Interfaces, 2017, pp. 1-38, 1601192.

* cited by examiner

*Primary Examiner* — Robert Clemente
(74) *Attorney, Agent, or Firm* — Bayramoglu Law Offices LLC

(57) ABSTRACT

A photothermal composition configured to be used in air filter for destroying bioaerosol particles by converting light energy emitted from a light source into heat energy including a photothermal agent is provided. The present invention also concerns an air filter for collecting the bioaerosol particles in an air flow and destroying said bioaerosol particles deposited thereon, including a photothermal agent which converts light energy emitted from a light source into heat energy.

16 Claims, No Drawings

USE OF PHOTOTHERMAL AGENTS IN AIR FILTERS

CROSS REFERENCE TO THE RELATED APPLICATIONS

This application is the national phase entry of International Application No. PCT/TR2020/050487 filed on Jun. 4, 2020, the entire contents of which are incorporated herein by reference.

TECHNICAL FIELD

The present invention relates to a photothermal composition having photothermal characteristics; in particularly the photothermal composition which is suitable for use in the air filtering systems and mainly composed of a photothermal agent and a nanoclay material. The present invention also relates to an air filtering system comprising the photothermal composition that enables the destruction of the bioaerosol particles that are accumulated on the air filter.

BACKGROUND

Air conditioning, heating and ventilating systems are widely used in indoor environments. Air filters used in heating, ventilating and air conditioning systems are designed to collect dust and a variety of airborne contaminants. The airborne contaminants are mostly living microorganisms that are accumulated on the air filters.

Bioaerosols are small biological airborne particles having a particle size ranging from 0.001 to 100 μm and they may be inhaled or ingested when exposed to humans due to the small particle size thereof. Bioaerosols consist of a combination of viable and nonviable microorganisms such as bacteria, fungi, viruses, fungi, spores, mold, mildew, yeasts, algae and also antigenic compounds of biological origin such as animal and plant debris, endotoxins, toxins, proteins, and any other microbial metabolites. They play a significant role in indoor air quality. Especially when accumulated in the deep lung regions, they can be the cause of many serious health problems, such as acute allergies and infectious diseases. Acute respiratory infections are the leading cause of death above all other infectious diseases.

Air systems circulate air continuously during their use. Improper use of air systems has become the main reason of indoor air pollution which poses many challenges to health. At present, HEPA filters are commonly used in air systems to collect undesired particles in the air. Even to the fact that this method filters particles, however undesired particles such as microorganisms in bioaerosols easily accumulate on the filter due to porous structure thereof. Large amounts of dust and bioaerosols are accumulated on the air filters when used for a longer period of time.

Bioaerosols deposited on the air filters may increase as the water vapour or moisture adsorbed by the filters. It needs to be cleaned or replaced frequently in order to overcome the increase of the microorganism growth on the filter. However, replacement and cleaning of the filters can be difficult for most of the users. In fact, fine particulate bioaerosols have an aerodynamic diameter less than. 2.5 μm and they cannot be destroyed completely even by disinfecting the filters regularly. On the other hand, the time when the filter needs to be cleaned or replaced may be forgotten and replacement of the filters regularly is not economical for the users over time.

Microorganisms from bioaerosols easily proliferate on the filter and then are being circulated throughout the indoor environment which results in secondary air pollution. In such a case, bioaerosols act as the cause of secondary air contamination, thereby effecting the air filtration performance adversely.

The secondary air pollution which is caused by the bioaerosol particles such as bacteria and viruses recirculated to the indoor air, is one of the important reasons of Legionnaires' disease and sick building syndrome. Sick building syndrome shows a set of clinically recognizable symptoms related to skin and mucous membrane and ailments in patients who stay in air-conditioned buildings for a period of time. Legionnaires' disease is a serious lung infection that is caused by Legionella bacteria, which is the most severe form of pneumonia and can be fatal.

Nowadays, air pollution especially caused by the bioaerosol particles due to the too much time spent in indoor places such as offices, schools, hospitals and malls is increasing in a significant manner. Therefore, air filtration systems in these indoor places play a very important role in the air circulation quality. Most of the air filters used in air filtration systems capture pathogen particles on the filter and keep these particles during its use. Pathogen airborne particles deposited on the air filter stay alive and grow rapidly on the air filter, then recirculated to the indoor air. Thus, the bioaerosol particles may diffuse through the indoor air; thereby decreasing the performance of the air filter.

Antimicrobial treatments for air filtration products have recently become a topic of considerable interest. In air filtration systems, air filters which are capable of capturing and inhibiting the growth of bioaerosol particles are commonly preferred. In such systems, inactivation capability of the filter is very critical. These systems are being used for improving indoor air quality by destroying a broad range of bioaerosols and preventing the growth thereof in the dirty filter. However, many of the antimicrobial treatments have limited success and various drawbacks. For instance, some of the agents used in the air filters are highly affected by humidity, air flow and evaporation; as a result, they may lose their effectiveness over time and the antimicrobial properties do not last during the whole lifetime of the filter. Further, many of these antimicrobials are hazardous to health, and can damage the environment.

In prior art, various herbal extracts and inorganic materials such as metal particles are incorporated into air filtration systems for achieving antimicrobial properties. For instance; Choi et. al. (https://doi.org/10.1021/acsami.5b07441) discloses an antimicrobial herbal material to be used in air filtration systems in order to inactivate airborne microorganisms. Sophora flavescens extract is mixed with a polymer solution for the electrospinning process. Obtained herbal extract incorporated nanofibers are thus proposed for eliminating the growth of the airborne particles on the air filters. However, air filtration systems comprising herbal extracts may show instability problems due to the degradation of the herbal extracts in time. This decreases the lifetime of the filters.

Alternatively, inorganic materials are suggested for use in air systems. Zhong et. al (https://doi.org/10.1021/acsami.5b06810) discloses the use of ZnO nanorods for inhibiting the propagation of both Gram positive and negative bacteria on the filters.

Destri et. al (https://doi.org/10.1080/17458080.2016.1181277) discloses the deposition of silver nanoparticles on the polyester air filters. The silver nanoparticles are stabilised with anionic polyelectrolytes, then immobilised on polyester air filters using a layer-by-layer technique. Even the use of metal particles used in air filtration systems are effective in controlling bioaerosols, many warnings are reported by health authorities regarding to its use in air systems. For example, previous studies have indicated that silver nanoparticles are toxic to mammalian cells and certain organs because of transcutaneous penetration of the particles Moreover, long-term inhalation of these nanoparticles can lead to a reduction in respiratory function.

There is a significant demand for a durable air filter which eliminates the need of the replacement and cleaning of the filter. Further, a system is needed for providing a cleaner air in the indoor environments. An air filter is also required which inhibits the propagation of the bioaerosol particles and also destroys the bioaerosol particles physically on the filter and improves the air quality in an efficient manner over the lifetime of the air filter. What is also needed is an air filter that is resistant to environmental conditions for longer periods.

SUMMARY

Primary object of the present invention is to overcome the abovementioned shortcomings of the prior art.

Another object of the present invention is to ensure a cleaner air being circulated through the indoor environment.

Another object of the present invention is to provide a photothermal agent to be used in an air filter in order to destroy the bioaerosol particles accumulated on the air filter by killing them physically with high efficiency.

Another object of the present invention is to provide a high efficiency air filter which greatly reduces bioaerosol concentrations in the air being circulated in an indoor environment for improving the air quality.

Another object of the present invention is to eliminate the need of the replacement and/or cleaning of the air filter regularly.

Another object of the present invention is to obtain a stable composition which provides long term uses in air filters for inhibiting the growth of the bioaerosol particles accumulated on the air filter.

Another object of the present invention is to provide a photothermal composition to be used in an air filter which has high photothermal properties and thermal stability.

Another object of the present invention is to provide an antimicrobial composition which is not harmful on the human body.

Another object of the present invention is to provide an air filter which has a self-disinfection property without the necessity of any manual operation.

Another object of the present invention is to provide a reusable antimicrobial air filter and also to minimize the manufacturing cost of the air filter having high antimicrobial properties.

Another object of the present invention is to provide an air filtering system which is practical in use and effective in destruction of the bioaerosol particles at the same time.

The present invention also proposes a photothermal composition configured to be used in an air filter for destroying bioaerosol particles by converting light energy emitted from a light source into heat energy comprising a photothermal agent. The photothermal agent is preferably a semi-conducting polymer.

In an embodiment of the invention; the photothermal agent is present in an amount between 1%-50%, preferably 5%-20% by weight of the photothermal composition. Disclosed photothermal agent optionally has an absorption wavelength ranging from 700 nm to 1100 nm.

According to the invention; the photothermal agent may comprise polydopamine, polypyrrole, polyaniline, polythiophene or a combination thereof. Preferably polydopamine is used as a photothermal agent.

According to another embodiment of the invention; the photothermal composition which comprises a photothermal agent may further comprise a nanoclay. The nanoclay may be coated with the photothermal agent. Disclosed nanoclays may comprise halloysite, montmorillonite, bentonite, smectite or combinations thereof; preferably the nanoclay is halloysite.

According to another embodiment of the invention; the photothermal composition may further comprise a fluorophore compound. This fluorophore compound may have an absorption wavelength ranging from 700 nm to 1100 nm.

According to another embodiment of the invention; the photothermal composition comprises a fluorophore compound in addition to the photothermal agent and the nanoclay. The photothermal agent coated nanoclay may be also coated with the fluorophore compound or the inner lumen of the photothermal agent coated nanoclay may be loaded with the fluorophore compound. The fluorophore compound may comprise indocyanine green, 3,3'-diethylthiatricarbocyanine or a combination thereof.

The present invention also proposes an air filter for collecting the bioaerosol particles in an air flow and destroying said bioaerosol particles deposited thereon, comprising a photothermal agent which converts light energy emitted from a light source into heat energy. A semi-conducting polymer may be used as a photothermal agent in the air filter of the present invention. The photothermal agent may have an absorption wavelength ranging from 700 nm to 1100 nm. Disclosed photothermal agent may comprise polydopamine, polypyrrole, polyaniline, polythiophene or combinations thereof. Polydopamine is preferably used as a photothermal agent.

According to another embodiment of the invention; the air filter may further comprise a nanoclay in addition to the photothermal agent. Said nanoclay may be coated with the photothermal agent. Disclosed nanoclay may comprise halloysite, montmorillonite, bentonite, smectite or a combination thereof. Optionally, halloysite is used as a nanoclay in the air filter of the present invention.

According to another embodiment of the present invention; the air filter may further comprise a fluorophore compound. Said fluorophore compound may have an absorption wavelength ranging from 700 nm to 1100 nm. In an embodiment; the air filter comprises a photothermal agent, a nanoclay and a fluorophore compound. Accordingly, the nanoclay is coated with the photothermal agent firstly. Then the photothermal agent coated nanoclay may be coated with the fluorophore compound or the inner lumen of the photothermal agent coated nanoclay may be loaded with the fluorophore compound. The fluorophore compound of the air filter may comprise indocyanine green, 3,3'-Diethylythiatricarbocyanine or a combination thereof.

The present invention also provides an air filtering system comprising a housing including an intake that receives air and a discharge that returns air; an air mover that forces air to flow through the housing from the intake to the discharge; a filter module comprising at least one air filter and a photothermal composition comprising a photothermal agent.

The air filter of the air filtering system may be loaded by the photothermal composition. Accordingly, the air filter may be formed of glass fiber, polymeric nanofiber, carbon fiber, synthetic resin, nonwoven pleated filer, honeycomb-monolith filter media, solution comprising at least one of polyacrylonitrile (PAN), polyvinyl alcohol (PVA), polyethylene oxide (PEN) and polyvinylpyrrolidone (PVP), polyamide (PA), polymethylmethacrylate (PMMA), polydimethylsiloxane (PDMS), polystyrene (PS), polypropylene (PP), polyurethane (PU), Polyvinylidene fluoride (PVDF).

According to an embodiment of the invention; said filter may be obtained from a mixture of said photothermal composition and a polymeric solution comprising polyacrylonitrile, polyvinyl alcohol, polyimide, polymethylmethacrylate, polydimethylsiloxane, polystyrene, polypropylene, polyurethane or combinations thereof.

According to another embodiment of the invention; the air filtering system may comprise a light module configured to be positioned to project light on the air filter comprising the photothermal composition. The light source may be LED lamps and optionally, the LED lamps may have an absorption wavelength between 700 nm and 1100 nm.

According to another embodiment of the invention; the photothermal composition of the air filter disposed in the air filtering system may also be activated by sunlight.

DETAILED DESCRIPTION OF THE EMBODIMENTS

The present invention relates to a photothermal composition configured to be used in an air filter for destroying bioaerosol particles by converting light energy emitted from a light source into heat energy comprising a photothermal agent. The photothermal composition comprises at least one photothermal agent for providing the temperature increase around the particles of the photothermal agent. Thus, it is possible to disinfect the air filter from the bioaerosol particles accumulated thereon.

Photothermal agent transforms light energy into heat energy as it absorbs light from a light source. Thus, temperature increases due to the obtained heat energy around the particles of photothermal agent; thereby deteriorating the genetic material of the microorganisms in the bioaerosols which results in the physical destruction of the microorganisms in the bioaerosols. Transformation of light energy into heat energy causes cell death of the microorganisms in the bioaerosols by physical destruction thereof due to hyperthermia. Most of the pathogenic bacteria and viruses lose their vitality as a result of membrane destruction when the ambient temperature rises above 45° C. The photothermal composition comprising a photothermal agent as defined herein, has a significant impact even on the antibiotic resistant bacteria and persistent viruses.

By the use of photothermal composition in the air filter; local heat emission is provided only by the absorption of light energy which results in local temperature increase around the particles of the photothermal agent. The destruction of the bioaerosol microorganism is therefore possible by heating the photothermal agents only instead of heating the whole air filter or air system. Such superior properties of photothermal agents allow high potential of reusable air filters which are also durable to environmental conditions.

The term "air" used herein means the air being circulated through an indoor environment by an air system.

The photothermal composition comprising a photothermal agent is activated by a light source. The light emitted from a light source is converted into the heat energy that increases the temperature directly. Therefore, the photothermal composition contributes to reduction of the bioaerosol-related air pollution in an indoor environment.

The term "photothermal composition" refers to any a composition which comprises a photothermal agent. The photothermal composition may comprise one or more photothermal agents. In another embodiment, the photothermal composition may comprise one or more auxiliary agents in addition to the photothermal agent. The photothermal composition shows superior antimicrobial effect due to the photothermal agent and destroys the bioaerosol particles accumulated on the air filter effectively. The destruction of the bioaerosol particles occurs by the use of the photothermal composition of the invention. When the photothermal composition is activated by the light, bioaerosol particles on the air filter is destroyed physically due to the temperature elevation caused by the transformation of the light energy into heat energy.

Bioaerosol particles may be bacteria, fungi, virus, spores, mold, mildew, yeasts, algae and also antigenic compounds of biological origin such as animal and plant debris, endotoxins, toxins, proteins, and any other microbial metabolites.

According to the invention, a semi-conducting polymer may be used as a photothermal agent. Semi-conducting polymers, also called as π-Conjugated polymers, consist of alternating electron-rich (donor) and electron-deficient (acceptor) heterocyclic π-building units. High absorption capacity at the near infrared wavelength enables superior photothermal abilities.

The photothermal agent used in the photothermal composition may have an absorption wavelength ranging from 700 nm to 1100 nm. Photothermal agents having the ability of absorption near infrared light within a wavelength ranging from 700 nm to 1100 nm, acts against microorganisms upon irradiation with near infrared light successfully.

In an embodiment of the invention; the photothermal agent is present in an amount between 1%-50%, preferably 5%-20% by weight of the photothermal composition. When such a specific amount of photothermal agent is used in the composition; superior photothermal characteristics, desired antimicrobial effect and stability of the photothermal composition on long term use is provided. When the photothermal agent is used in a very high amount in the photothermal composition with an expectation of improved photothermal quality, incorporation of the photothermal composition into the air filter material can be difficult. Vice versa, the use of low amount of photothermal agent causes inadequate light absorption that results in inefficient destruction of the bioaerosol particles from the air filter. It is observed that, when the photothermal agent is used in an amount between 1%-50%, preferably 5%-20% by weight of the photothermal composition; photothermal properties are enhanced in a significant manner and manufacturing of the photothermal composition becomes easier.

In an embodiment of the invention; the photothermal agent may comprise polydopamine, polypyrrole, polyaniline, polythiophene or a combination thereof. Disclosed photothermal agents ensure high light to heat conversion efficiency and high thermal conductivity. Preferably, polydopamine may be used as a photothermal agent in the photothermal composition.

In an embodiment of the present invention; the photothermal composition which includes a photothermal agent further comprises a nanoclay. The use of a nanoclay together with a photothermal agent overcomes the problems related to the direct application of the photothermal agent onto an air filter which not only has a high manufacturing cost, but also reduces the processability of the material. The nanohybrid structure of a nanoclay and a photothermal agent shows superior photothermal properties due to the localization of higher photothermal agent amounts on the nanoclay surface, which enables a higher efficiency of light-heat transformation. In such a case, improved and long-lasting antimicrobial activity is obtained based on the use of photothermal composition according to the invention.

The term "nanoclay" refers to nanoparticles of a clay material which can be a naturally occurring mineral, an organically modified mineral, or a synthetic nanomaterial. The average dimension size of the nanoclay particles are generally less than 1000 nm.

The combination of a nanoclay which has a particle size in nanoscale and a photothermal agent can be called as a nanohybrid. This nanohybrid form of the nanoclay and the photothermal agent provides superior physical and chemical properties to the photothermal composition. The term "nanohybrid" refers to a mixture of a photothermal agent and a nanoclay. The nanohybrids may further comprise an auxiliary agent. The photothermal composition includes nanohybrids of a photothermal agent and a nanoclay.

The absorbent properties and the large surface area of the nanoclay due to its tubular structure attributes high performance of a photothermal composition which can be activated by a light source.

In another embodiment of the present invention; the nanoclay is coated with the photothermal agent. The photothermal composition exhibits a high increase in the temperature when the nanoclay is coated with a photothermal agent. The light absorption capacity is significantly improved based on the presence of photothermal agent coated nanoclays.

The nanoclay may comprise halloysite, montmorillonite, bentonite, smectite or a combination thereof. Preferably, halloysite is used as a nanoclay in the photothermal composition.

According to the invention; the photothermal composition may comprise polydopamine and a nanoclay for destroying bioaerosol particles deposited on the air filter by converting light energy emitted from a light source into heat energy. Nanoclays functionalized with polydopamine, can transform light energy into heat energy as the polydopamine absorbs light from a light source. This results in high increase in the temperature on the surface of the polydopamine coated nanoclays. Nanoclay based polydopamine acts as a non-toxic material which are suitable for employing in photothermal compositions to be used in air filters in order to destroy bioaerosol particles deposited on the air filter.

According to another embodiment of the invention; the photothermal composition which is suitable for use in an air filter, comprises polydopamine and halloysite for enabling photothermal characteristics. Dopamine is added to the halloysite dispersion, then the surface of the halloysite is coated with polydopamine after dopamine polymerization due to incubation. Obtained structure may be also called a nanohybrid formed of polydopamine and halloysite according to the invention.

The photothermal composition incorporated into the air filter needs to be reusable for enabling long term use. Reusable air filter means that the photothermal agent provides the same increase in the temperature based on the light activation. Light activation provides transformation of light energy into the heat energy, thereby enabling temperature increase. Photothermal agents which are disclosed to be polydopamine, polypyrrole, polyaniline, polythiophene or combinations thereof show high thermal stability, in other words keep its photothermal characteristics during long term use.

According to another embodiment of the invention, the photothermal composition of the invention may further comprise a fluorophore compound. Said fluorophore compound contributes to the light absorption capacity of the photothermal composition and also to the heat energy emitted by the photothermal composition. For this purpose, nanohybrids comprised of a photothermal agent and a nanoclay, are enriched with a fluorophore compound. Fluorophore compounds shows high light absorption capacity, thereby improving the absorption capacity of the nanohybrids formed of a nanoclay and a photothermal agent. Said fluorophore compound may have an absorption wavelength ranging from 700 nm to 1100 nm.

The incorporation of the fluorophore compound to the photothermal composition may be provided in different ways. For instance, the photothermal agent coated nanoclay may be also coated with the fluorophore compound or the inner lumen of the photothermal agent coated nanoclay may be loaded with the fluorophore compound. Both loading of the inner lumen and the coating of the photothermal agent coated nanoclay are possible at the same time. When fluorophore is incorporated to the photothermal composition; the photothermal agent is preferably polydopamine and the nanoclay is preferably halloysite.

For loading the inner lumens of the photothermal agent coated nanoclay with a fluorophore compound; the nanohybrids comprised of the nanoclay and photothermal agent are added into a solution of the fluorophore compound and then subjected to ultrasonication. The air inside the nanohybrids of nanoclay and the photothermal agent is discharged by applying a vacuum. The fluorophore compound then fills up the inner lumen of the nanohybrids after finishing the vacuum application. As a result, photothermal agent coated nanohybrids are loaded with the fluorophore compound.

For coating the surface of the nanohybrids that comprises the nanoclay and the photothermal agent; said nanohybrids are added to the phosphate buffer solution containing fluorophore compound to form a fluorophore coating on the surface of the nanohybrids. Therefore, photothermal agent coated nanoclay is also coated with the fluorophore compound.

According to the invention; the fluorophore used in the photothermal composition may comprise indocyanine green, 3,3'-diethylythiatricarbocyanine or a combination thereof. Disclosed fluorophore compounds have an attribution to the photothermal properties such as the increase of the absorption capacity.

The photothermal composition according to the invention is activated by a light source. The photothermal agent of the composition emits light from a light source, then transforms the emitted light energy into heat energy, thereby increasing the temperature around the particles of the photothermal agent. The light source may radiate a near infrared light, preferably having an absorption wavelength ranging from 700 nm to 1100 nm. The term "light source" refers to any kind of source that radiates sufficient light for activating the photothermal composition and increasing the temperature around the particles of the nanohybrids. Optimum antimicrobial effect is provided when the photothermal composition enables an increase in the temperature such as over 45° C. upon irradiation with light. The photothermal composition may be activated by sunlight, LED lamps, laser light or incandescent bulbs.

The ability of the activation by sunlight ensures a wide range of use by eliminating the requirement of a separate light module.

The present invention also provides an air filter for collecting the bioaerosol particles in an air flow and destroying said bioaerosol particles deposited thereon, comprising a photothermal agent which converts light energy emitted from a light source into heat energy. The photothermal agent enables an increase in the temperature by absorbing light energy emitted from a light source. Antimicrobial effect is ensured by temperature increase due to the transformation of light energy into heat energy. Destruction of bioaerosol particles deposited on the air filter are thus provided by the increase of the temperature around the particles of the photothermal agent.

Air filters known in the prior art are commonly used for collecting dust and many bioaerosol particles. For the first time, an air filter is described which is incorporated with a photothermal agent that provides light-activated destruction of the bioaerosol particles by locally occurred high temperature. Destruction of the bioaerosols is occurred due to the temperature increase after the photothermal agent is activated by the light. This photothermal mechanism to be used in the air filter is not suggested before. Very high antimicrobial performance is provided by the use of a photothermal agent in an air filter.

The amount of the bioaerosol particles in an indoor environment is drastically decreased by the use of an air filter having a photothermal agent according to the invention. Thus, many health problems such as acute allergies and infectious diseases are minimized by the use of air filter containing a photothermal agent. The photothermal agent may be a semi-conducting polymer. The use of a semi-conducting polymer is suggested based on its strong near infrared light absorption abilities which contributes to photothermal properties of the air filter. The photothermal agent may have an absorption wavelength ranging from 700 nm to 1100 nm. According to the invention; the photothermal agent comprises polydopamine, polypyrrole, polyaniline, polythiophene or a combination thereof. Preferably, polydopamine is used as a photothermal agent. The use of polydopamine provides an antimicrobial affect in the air filter which lasts longer.

In another embodiment of the invention, the air filter which comprises a photothermal agent further comprises a nanoclay. The nanoclay is preferably coated with the photothermal agent. The combination of a plurality of the photothermal agent and nanoclay may be called as a photothermal composition. The structure which is formed of a nanoclay and photothermal agent is defined as a nanohybrid that provides improved photothermal properties. In other words; the photothermal composition suitable for use in an air filter comprises nanohybrids formed of a photothermal agent and a nanoclay. According to the invention, nanoclays to be used in combination with a photothermal agent in the air filter may comprise halloysite, montmorillonite, bentonite, smectite or a combination thereof.

In an embodiment of the invention; the air filter comprises nanohybrids of a photothermal agent and a nanoclay. The amount of the photothermal agent in said nanohybrids determines photothermal properties. The photothermal agent affects photothermal quality and the ability of the transformation of light energy into heat energy. Preferably, the photothermal agent is used in an amount between 1%-50%, preferably 5%-20% by the total weight of the nanohybrids. Accordingly, polydopamine may be used as a photothermal agent, while halloysite is used as a nanoclay in said nanohybrids.

According to another embodiment of the invention; the air filter may further comprise a fluorophore compound. The fluorophore compound may preferably have an absorption wavelength ranging from 700 nm to 1100 nm. Nanohybrids that are formed of a photothermal agent and a nanoclay are further incorporated with a fluorophore compound for improving light absorption capacity of the nanohybrids. The photothermnal agent coated nanoclays, in other words nanohybrids formed of a nanoclay and a photothermal agent, may be coated with the fluorophore compound. In such a case, the surface of the photothermal agent coated nanoclay is also coated with the fluorophore compound. Alternatively, the inner lumen of the nanohybrids, in other words photothermal agent coated nanoclays, may be filled with the fluorophore compound. In this case, the photothermal agent coated nanoclay is loaded with the fluorophore compound. The fluorophore compound may comprise indocyanine green, 3,3'-diethylthiatricarbocyanine, or a combination thereof. Fluorophore enriched nanohybrids formed of a photothermal agent and a nanoclay shows superior absorbance capacity.

The present invention also provides an air filtering system which a housing including an intake that receives air and a discharge that returns air; an air mover that forces air to flow through the housing from the intake to the discharge; a filter module comprising at least one air filter according to the invention and a photothermal composition comprising a photothermal agent according to the invention. The air filter of the invention not only destroys the bioaerosol particles deposited thereon, but also shows high filtration properties thereby enabling a better air circulation. This reduces the risks for bioaerosol related health problems.

The air filtering systems show high antimicrobial effect due to the photothermal composition loaded on the air filter. The photothermal composition of the invention which provides a high increase in the temperature during its use, does not damage the filtration characteristic of the air filter.

Many methods can be applied in the loading process of the nanohybrids comprised of the photothermal agent and the nanoclay to the air filter. Independently of the method used, both of the filtration quality and photothermal properties should remain the same. The air filter is loaded by the photothermal composition of the invention by any suitable process.

The air filter may be formed of a glass fiber, polymeric nanofiber, carbon fiber, synthetic resin, nonwoven pleated filer, honeycomb-monolith filter media, solution comprising at least one of polyacrylonitrile (PAN), polyvinyl alcohol (PVA), polyethylene oxide (PEN) and polyvinylpyrrolidone (PVP), polyamide (PA), polymethylmethacrylate (PMMA), polydimethylsiloxane (PDMS), polystyrene (PS), polypropylene (PP), polyurethane (PU), Polyvinylidene fluoride (PVDF). These compounds ensure the optimum filtration quality which is important in collecting dust and bioaerosol particles.

In an embodiment of the invention; the air filter which is formed of a glass fiber, polymeric nanofiber, carbon fiber, synthetic resin, nonwoven pleated filer or honeycomb-monolith filter media may be coated with the photothermal composition comprising nanohybrids of the photothermal agent and the nanoclay. Minimum 90% of the bioaerosol particles are destroyed when the photothermal composition is coated on the air filter. The coating of the photothermal composition on the air filter may be carried out by a dipping process.

Alternatively, the air filter may be obtained from a mixture of a polymeric solution and the photothermal composition. The polymeric composition may comprise polyacryloxiitrile, polyvinyl alcohol, polyamide, poly methylmethacrylate, polydimethylsiloxane, polystyrene, polypropylene, polyurethane or a combination thereof. The photothermal agent are added to the polymeric solution and then composite nanofibers which are suitable for use as an air filter are obtained by an electrospinning process. It is observed that, when polyacrylonitrile and polyvinyl alcohol is used to form a polymeric solution, the obtained composite nanofibers have superior filtration performance. While the nanohybrids comprised of the photothermal agent and the nanoclay contributes to photothermal properties; said polymers enhances the filtration performance of the air filter. Minimum 90% of the bioaerosol particles are destroyed when the composite nanofibers including the photothermal composition is used as an air filter.

The air filtering system may be any kind of system which circulates the air through an indoor environment. The air filter according to the invention may be used in an air conditioner, air purifier.

Air filters used in the air filtering systems are entirely illuminated by any light source in order to increase the temperature of the photothermal compositions including the photothermal agent. The temperature may preferably reach 45° C. or above due to the irradiation. The light source may be either a separate light module or a sunlight. When the air filter is exposed to the light entirely coming from a light module or sun, the photothermal agent in the nanohybrids absorb the light and then transform the light energy into heat energy; thereby increasing the temperature of the nanohybrids. This results in destruction of the bioaerosol particles deposited on the air filter. The capability of being activated by either a light module or sunlight allows a wide range of use. Light emitting diode (LED) lamps may be preferably used for illuminating the air filter of the air filtering system. One or more LED lamps may be positioned to project light to the entire surface of the air filters.

The light source may preferably radiate a near infrared light having a wavelength ranging from 700 nm to 1100 nm.

What is claimed is:

1. A photothermal composition configured to be used in an air filter for destroying bioaerosol particles by converting a light energy emitted from a light source into a heat energy, comprising a photothermal agent and a fluorophore compound, wherein the photothermal agent is coated with the fluorophore compound.

2. The photothermal composition according to claim 1, wherein the photothermal agent is present in an amount between 1%-50% by weight of the photothermal composition.

3. The photothermal composition according to claim 1, wherein the photothermal agent comprises a polydopamine, a polypyrrole, a polyaniline, a polythiophene, or a combination of the polydopamine, the polypyrrole, the polyaniline, and the polythiophene.

4. The photothermal composition according to claim 1, wherein the fluorophore compound comprises an absorption wavelength ranging from 700 nm to 1100 nm.

5. The photothermal composition according to claim 1, wherein the fluorophore compound comprises an indocyanine green, 3,3'-diethylythiatricarbocyanine, or a combination of the indocyanine green and the 3,3'-diethylythiatricarbocyanine.

6. A photothermal composition configured to be used in an air filter for destroying bioaerosol particles by converting a light energy emitted from a light source into a heat energy, comprising a photothermal agent and a fluorophore compound, wherein an inner lumen of the photothermal agent is loaded with the fluorophore compound.

7. An air filter for collecting bioaerosol particles in an air flow and destroying the bioaerosol particles deposited on the air filter, comprising a photothermal agent, a nanoclay and a fluorophore compound, wherein the photothermal agent converts a light energy emitted from a light source into a heat energy.

8. The air filter according to claim 7, wherein the photothermal agent comprises a polydopamine, a polypyrrole, a polyaniline, a polythiophene, or a combination of the polydopamine, the polypyrrole, the polyaniline, and the polythiophene.

9. The air filter according to claim 7, wherein the fluorophore compound comprises an absorption wavelength ranging from 700 nm to 1100 nm.

10. The air filter according to claim 7, wherein the photothermal agent is coated with the fluorophore compound.

11. The air filter according to claim 7, wherein an inner lumen of the photothermal agent is loaded with the fluorophore compound.

12. The air filter according to claim 7, wherein the fluorophore compound comprises an indocyanine green, 3,3'-diethylythiatricarbocyanine, or a combination of the indocyanine green and the 3,3'-diethylythiatricarbocyanine.

13. An air filtering system comprising:
a housing including an intake and a discharge, the intake receiving an air and the discharge returning the air;
an air mover forcing the air to flow through the housing from the intake to the discharge;
a filter module comprising at least one air filter according to claim 7, and
a photothermal composition, wherein the at least one air filter is loaded with the photothermal composition.

14. The air filtering system according to claim 13, further comprising a light module configured to be positioned to project a light on the at least one air filter comprising the photothermal composition.

15. The air filtering system according to claim 14, wherein the light source is one or more LED lamps.

16. The air filtering system according to claim 13, wherein the photothermal composition of the air filtering system is activated by a sunlight.

* * * * *